Jan. 31, 1939.  E. M. SALERNI  2,145,374
APPARATUS FOR SUBJECTING GASES TO THE ACTION OF LIQUIDS
Filed June 2, 1937

E. M. Salerni
INVENTOR

By Glascock, Downing & Seebold
Attys.

Patented Jan. 31, 1939

2,145,374

UNITED STATES PATENT OFFICE 2,145,374

APPARATUS FOR SUBJECTING GASES TO THE ACTION OF LIQUIDS

Edoardo Michele Salerni, Paris, France

Application June 2, 1937, Serial No. 146,044
In Great Britain June 10, 1936

1 Claim. (Cl. 261—92)

This invention relates to apparatus for subjecting gases and vapours to the action of liquids, for the purpose of scrubbing, washing, condensing, evaporating, distilling, crystallizing or otherwise treating the same.

It has already been proposed to submit gases and vapours to the action of liquids for the purpose of scrubbing or condensing the same by passing the gases or vapours through a casing containing at its lower portion a liquid medium such as oil or water and a multiplicity of discs which thrash and throw the liquid medium up so as to spray the gaseous medium passing through the chamber. Such known processes are open to the objection that the liquid medium, tends to become emulsified owing to the churning action of the rotating disc, while particles of the liquid medium sprayed into contact with the incoming gases or vapours are carried away in suspension through the outlet opening for the gases and vapours. In contradistinction to the aforesaid processes, the casing containing the series of shafts arranged parallel to one another and at right angles to the incoming gases or vapours, and upon which the said discs are rotatably mounted, may be trough shaped at its lower part and curved at its upper part so as to conform closely to the contour of the discs so that the gaseous medium is compelled in passing from the inlet to the outlet opening of the discs, to pass between the discs. Owing to the fact that the edges of the discs face the inlet and outlet openings for the gases and vapours, the discs act as impellers which assist, instead of, as in earlier proposals, retarding, the passage of the gases from the inlet to the outlet of the apparatus. On account of the fact that the discs are rotated at a relatively low speed, say 10–50 revs. per minute, or that only a slow movement of oscillation is imparted to the plates, the liquid medium in the lower part of the casing is not, as in previous proposals, churned or thrown up in the form of a spray into contact with the incoming gases or vapours, as the main function of the discs or plates, according to the present invention, is to divide the gases or vapours into thin layers which are brought into intimate contact with liquid coated discs or plates.

It will be understood that in cases where the apparatus is used for the evaporating or distilling of liquids the liquid in the lower part of the chamber containing the rotating discs or oscillating plates is brought into contact with hot gases which pass through the interstices between the discs or the plates and/or the liquid within the chamber containing the discs or oscillating plates may be heated externally.

A preferred embodiment of the present invention is illustrated in the annexed drawing, in which.

Figure 1:
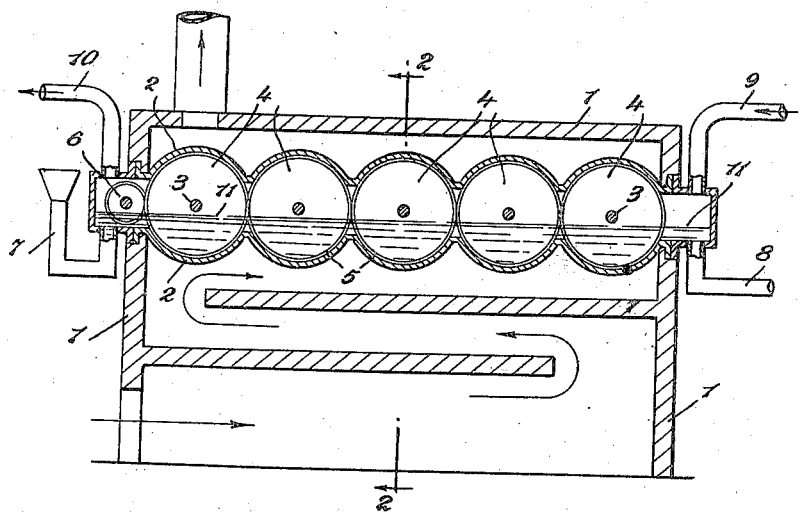
Fig. 1 shows a longitudinal vertical section of a furnace provided with a device according to the invention.
Figure 2:
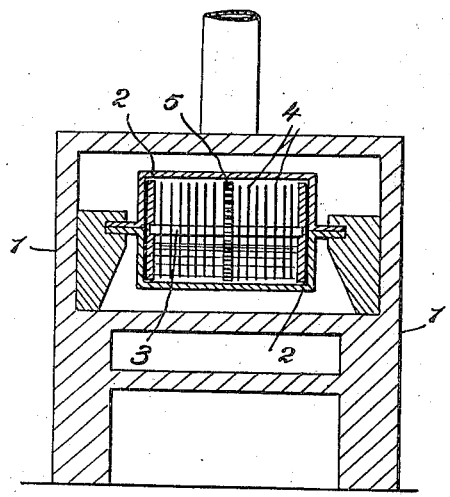
Fig. 2 is a vertical section on the line 2—2 of Fig. 1.

Referring to Figs. 1 and 2, in a furnace 1 is mounted a casing 2, in the interior of which are rotatably mounted the shafts 3 carrying discs 4. Each shaft 3 has fixedly mounted thereon a gear wheel 5, all gear wheels 5 being intermeshing, and movement being imparted thereto by means of a driving toothed pinion 6.

The liquid to be treated is admitted through the feeding pipe 7 and is exhausted through the outlet 8. In the stripping or scrubbing apparatus according to Figures 1 and 2, a gas stream is admitted in counterflow by the pipe 9 and discharged by the pipe 10 after having been charged with vapors stripped from the liquid wetting the discs 4. The discs 4 dip into the liquid 11, which slowly passes in the trough-like casing 2 from inlet 7 to outlet 8.

The undulated or channeled form of the bottom of the casing, as shown in Figs. 1 and 2, avoids any incrustation of carbon or of any other material. In this way the rotative action of the discs extending into the corrugations or undulations of the bottom avoid any formation of deposits by means of the continuous movement imparted thereby to the liquid.

Having now particularly described and ascertained the nature of my said invention and in what manner the same is to be performed, I declare that what I claim is:

In apparatus for subjecting gases to the action of a liquid, a housing formed of heat insulating material, a casing arranged in said housing, the top and bottom portions of said casing being of undulating form to provide arcuate spaces extending across the casing, a shaft carrying a plurality of rotatable spaced discs arranged in each of said arcuate spaces, means for admitting liquid to the casing so that each surface of the rotating disc carries a film of the liquid, and means for admitting gas to one end of the casing whereby the arcuate form of the top of the casing causes the gas to pass along the surface of each disc in the successive arcuate spaces.

EDOARDO MICHELE SALERNI.